United States Patent Office 3,106,593
Patented Oct. 8, 1963

3,106,593
SEPARATION OF POLYMERIZABLE HYDROCARBONS USING NITROGEN BASE-ADDED MOLECULAR SIEVES
Hans A. Benesi and Donald L. Peterson, Berkeley, Calif., assignors to Shell Oil Company, a corporation of Delaware
No Drawing. Filed Oct. 26, 1959, Ser. No. 848,520
14 Claims. (Cl. 260—681.5)

This invention relates to an improved process for the separation of selectively sorbable compounds from admixtures containing reactive olefinic compounds. More particularly the invention is concerned with an improvement in a process in which sorbable hydrocarbons are removed from admixture with nonsorbable hydrocarbons by zeolitic molecular sieve sorbents.

It is well known that certain zeolites having rigid three-dimensional anionic networks with intracrystalline interstitial channels whose narrowest cross section has essentially a uniform diameter, e.g., in the range from 3 to 13 Angstrom units, have the characteristic of selectively sorbing compounds whose maximum critical molecular diameter is not substantially larger than said channel diameter. These zeolites are known as "molecular sieves" and the intracrystalline channels are known as "pores." Such zeolites are described, for example, in a paper entitled "Zeolites as Absorbents and Molecular Sieves," by R. N. Barrer, "Annual Reports on the Progress of Chemistry for 1944," vol. 61, pp. 31–46, London (1945), and in U.S. Patent 2,306,610 to Barrer. More recently certain synthetic molecular sieves have become commercially available from Linde Company, a division of Union Carbide Corporation.

The zeolitic molecular sieves are characterized by very great selectivity, and a very high capacity for sorbing compounds whose maximum critical molecular diameter is of the order of the pore diameter of the sieve. The sieves are, therefore, useful for separating compounds of a given maximum critical molecular diameter out of mixtures containing other compounds of larger maximum critical molecular diameter.

Although zeolitic molecular sieves have been used for the selective sorption of some olefins, particularly the normally gaseous hydrocrabon monoolefins, i.e., ethylene, propylene and butylenes, it has now been found that olefins, and particularly diolefins, undergo polymerization when in contact with zeolitic molecular sieves. For purposes of the present specification and claims, the group of olefins which undergoes polymerization in contact with untreated molecular sieve zeolites is designated "reactive olefins."

The polymerizing characteristic is undesirable when zeolitic molecular sieves are to be used in the separation of hydrocarbon mixtures containing reactive olefins because some of the olefin content of the feed is lost to a polymer of indeterminate structure and because some of the polymer tends to remain on the sieve, even under relatively severe regeneration conditions, causing a loss in sieve capacity.

It has now been found that the undesired polymerization of reactive olefins in contact with zeolitic molecular sieves can be readily inhibited by a simple and effective treatment of the molecular sieve in accordance with this invention. The treatment consists in adding to the zeolitic molecular sieve a controlled amount of a nitrogen base whose molecular size is such that it can enter the pores of the molecular sieve.

It is an object of this invention to provide a process for separating hydrocarbons from admixtures containing reactive olefinic compounds. It is a further object of the invention to provide a method for separating reactive normal olefinic hydrocarbons from admixture with non-normal hydrocarbons. It is a specific object to provide a method for separating piperylene from isoprene. Another object is to provide a method for conditioning zeolitic molecular sieves for use in separation of mixtures containing reactive olefinic compounds.

The zeolites belong to a group of aluminum silicate crystals having a framework structure in which every tetrahedron of $SiO_4$ or $AlO_4$ shares all its corners with other tetrahedra, thus accounting for all the silicon, aluminum and oxygen atoms in the structure. These crystals have a chemical formula in which the ratio $(Si+Al):(O)$ is 1 to 2. Of the several types of known zeolites, only those having rigid frameworks are suitable molecular sieves. When originally formed, the zeolite crystals contain water in the interstices defined by the framework. On moderate heating this water can be driven off and the open interstices are then of uniform size suitable for sorbing compounds whose maximum critical molecular diameters are not substantially greater than the minimum diameters of the interstices.

Zeolitic molecular sieve sorbents suitable for use in this invention are alkali, alkaline earth, and combined alkali-alkaline earth metal aluminum silicates. This includes natural molecular sieves, e.g., chabazite, active analcite, gmelinite, and mordenite; modifications of naturally occurring zeolitic molecular sieves prepared by ion exchange from the original crystals, e.g., calcium and barium base exchanged mordenites; and synthetic molecular sieve zeolites, e.g., $BaAl_2 \cdot Si_4O_{12} \cdot nH_2O$, described by Barrer, and the group of synthetic molecular sieves which are commercially available from Linde Company. One of the latter molecular sieves is designated MS–4A. It is a zeolite of average composition

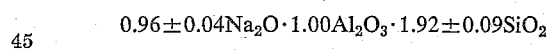
$0.96 \pm 0.04 Na_2O \cdot 1.00 Al_2O_3 \cdot 1.92 \pm 0.09 SiO_2$ plus an amount of water depending on the degree of dehydration; the crystals are cubic with unit cells measuring, on an edge, approximately 12.26 Angstrom units, and are characterized by an essentially uniform pore diameter of about 4 Angstrom units. Another sieve available from Linde is designated MS–5A. This is made from MS–4A by replacement of approximately 75% of the sodium ions with calcium ions by ion exchange. Its average composition is

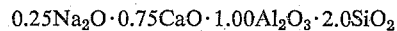
$0.25 Na_2O \cdot 0.75 CaO \cdot 1.00 Al_2O_3 \cdot 2.0 SiO_2$ its cubic crystals have about the same unit cell dimensions as MS–4A and are characterized by an essentially uniform pore diameter of about 5 Angstrom units. A third available sieve, designated MS–13X, has the approximate formula

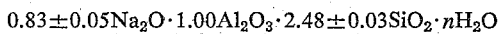
$0.83 \pm 0.05 Na_2O \cdot 1.00 Al_2O_3 \cdot 2.48 \pm 0.03 SiO_2 \cdot nH_2O$ It has cubic crystals with unit cells measuring, on an edge, approximately 24.95 Angstrom units. The essentially uniform pore diameter is about 13 Angstrom units.

The pure zeolitic molecular sieves, particularly the synthetic ones, generally are produced in the form of soft, powdery masses of small crystals. For use in commercial processes these zeolite crystals may be composited with binder materials, e.g., clays, alumina or other materials, to form stronger, more attrition-resistant particles. Such composites may be treated with a nitrogen base according to this invention.

The basis of the separation of sorbable compounds from nonsorbable compounds by means of zeolitic molecular sieves appears to be that the diameter of the largest cross section of the appropriately oriented sorbable molecule, designated the critical molecular cross section, must be below a certain limiting value, characteristic of the smallest cross section of the useful pores in the zeolite. The length of the molecule and its molecular volume are of secondary importance only.

For a spherical molecule the critical cross section is any cross section that bisects the sphere; for an elongated or chain molecule it is the largest cross section normal to the length of the molecule. In the case of a disc-shaped molecule, e.g., a cyclohydrocarbon, the distance across the disc in its shortest dimension in the plane of the disc is the governing factor. Many molecules which have a critical molecular diameter essentially the same or even somewhat larger than the critical pore diameter of the zeolite may nevertheless be sorbed by a process known as activated sorption. Other molecules of small cross section are more readily sorbed and diffuse into the channels of the zeolite more quickly. Barrer, in the above-mentioned papers, classifies molecular sieves into three classes characterized by different maximum pore diameters and consequently by the ability to sorb different compounds selectively.

Among the most useful hydrocarbon separations effected by molecular sieves are the sorption of methane or ethane from higher hydrocarbons by class II zeolites (Barrer classification system) and of normal paraffins or normal olefins of at least three or four carbon atoms per molecule from non-normals such as branched-chain aliphatics and cyclics by class I zeolites. Particularly useful separations are those of normal paraffins or olefins from branched or cyclic hydrocarbons by means of 5 Angstrom molecular sieves such as chabazite or Linde's molecular sieve type MS–5A.

The process of this invention is especially advantageous when mixtures containing diolefinic hydrocarbons are to be contacted with a zeolitic molecular sieve. The process is also suitably employed when the mixture to be contacted with a zeolitic molecular sieve contains reactive monoolefins, particularly normally liquid monoolefins.

In one important application of the process, a feed mixture consisting essentially of isoprene and a relatively small, contaminating proportion of piperylene is contacted with a 5 Angstrom molecular sieve treated in accordance with this invention. The effluent from this contact contains isoprene essentially free of contaminating normal hydrocarbons and particularly piperylene. The contact is continued until the capacity of the molecular sieve for sorption of piperylene is substantially exhausted, at which time flow of feed mixture is discontinued and the sorbed normal hydrocarbons are desorbed in a known manner, e.g., by passing an inert gas through the contact mass at an elevated temperature. If the nitrogen base employed in the treatment of the sieve was a relatively volatile one, e.g., ammonia, and the desorption conditions were such that it was driven off, additional nitrogen base is deposited in the regenerated contact mass and flow of the original feed mixture is then resumed. Numerous other separations in which the process of this invention can be advantageously applied will occur to those skilled in the art.

A number of different nitrogen bases are suitable for use in the process of this invention, including ammonia and various primary, secondary and tertiary amines. Compounds which liberate ammonia upon decomposition at relatively mild conditions, such as urea and ammonium carbonate, may also be employed.

The essential requirements of a suitable nitrogen base are that it be a relatively strong base, of the order of ammonia and that it be of such size that it can be admitted into the pores of the molecular sieve to be treated. Suitable bases for use in this process are those having the formula

in which each R represents hydrogen or an alkyl group or a non-acidic substituted alkyl group, provided the critical diameter of the molecules is no more than about 1 Angstrom unit larger than the pore diameter of the molecular sieve. The molecular weight of the base employed is preferably no greater than about 100. This assures that the molecule is not excessively bulky.

Compounds suitable for use as bases in this invention include ammonia, mono-, di- and trimethylamine, mono-, di- and triethylamine, ethylene diamine, propylene diamine, propylamine, higher n-alkylamines, chloro-substituted amines such as 1-amino-1-chloroethane, 1-amino-2-chloroethane and so forth.

It has been found that for a given type of zeolitic molecular sieve and nitrogen base there is a minimum amount of base which must be added to the zeolite in order to produce effective inhibition of polymerization activity. Larger amounts of base provide no further benefit and are, in fact, harmful in that they unnecessarily reduce the sorption capacity of the molecular sieve. In general, the amount of base required is in the range between 1 and 2 millimoles per gram of the zeolite (dehydrated basis). For zeolites of the synthetic A type, about 1.5 millimoles per gram is most suitable. However, larger amounts of base are desirable where the binder for the molecular sieve also sorbs the base.

Several methods are suitable for applying the nitrogen base to the zeolite. When ammonia or a relatively volatile amine such as methylamine is employed, it is suitable to pass a vapor mixture of the base and an inert gas through the contact mass until a predetermined amount of the base has been sorbed by the contact mass. Alternatively the vessel containing the contact mass can be evacuated to a low pressure and then placed in communication with a vessel containing the desired nitrogen base in liquid phase in equilibrium with its vapor so that vapor of the nitrogen base is drawn into the vessel containing the contact mass. The connection is maintained open until the contact mass has sorbed the desired amount of the base.

Another method of applying nitrogen base to a zeolitic molecular sieve consists in mixing the dry molecular sieve particles with an ammonia precursor, i.e., a compound which liberates ammonia either at atmospheric conditions or at such temperatures as will occur during the sorption step; any other product liberated simultaneously with the ammonia must be non-injurious to the zeolite. Suitable materials for this method of preparation are, for example, urea and ammonium carbonate. The amount added is that calculated to liberate the required amount of ammonia for effective inhibition of polymerization.

Still another method of applying nitrogen base to a zeolitic molecular sieve is to pass the base together with the feed to be separated through the contact mass. This method is advantageous where the polymerization rate of the reactive olefin is relatively slow so that the base inhibitor can build up on the sieve in the necessary amount before any appreciable loss in sorption capacity of the sieve occurs due to polymerization of the reactive olefin.

In using ammonia as the nitrogen base it is important that the addition of ammonia is carried out under conditions which do not lead to an exchange of the $NH_4^+$ cation for alkali metal or alkaline earth cation of the sieve. Thus, the addition of base is not carried out in aqueous solution or in any other polar solvent.

When the treated contact mass is employed in the separation of hydrocarbons it may be found that a small amount of the base appears in the effluent, particularly when all or part of the operation is carried out at a relatively high temperature. If this is the case it is suitable to add a makeup amount of the base continuously or periodically by admixing it with the feed or another gas passed to the contact mass. In determining the amount of makeup base to be added in the feed, factors to be considered are the nature of the base, sorbability of the base on the sieve, concentration of base to be maintained on the sieve, operating temperature, feed composition and the like. With a strongly sorbed base, particularly at low temperatures, only a minor amount of makeup base is desirable in the feed. With less strongly sorbed bases or at high temperatures, a larger amount of makeup base is desirable. The amount of makeup base generally preferred is from about 1 to about 500 parts per million by volume, based on the feed and more especially preferred from about 10 to about 400 parts per million by volume.

In the use of molecular sieve composites prepared by treatment in accordance with the present invention the same types of separations can be carried out with the treated molecular sieve that could be carried out with the untreated material. The molecular sieves treated according to this invention are greatly superior in the separation of mixtures including reactive olefinic compounds, compared to untreated molecular sieves.

The general operating conditions employed in the sorptive separation steps are the same as in processes employing untreated molecular sieves for separation of non-polymerizing compounds. The temperature in the sorption step may vary from room temperature up to 600° C., the pressure may vary from atmospheric or sub-atmospheric to as high as 1000 p.s.i.g. or higher and the liquid hourly space velocity of the charge may vary from as little as 0.1 to 40 v./v./hr. or higher. The separation process may be carried out in liquid or vapor phase.

In carrying out separations of mixtures containing reactive olefinic materials, substantially higher temperatures may be employed, if desired, with molecular sieves treated according to this invention than with untreated molecular sieves because with the latter type of sorbent, polymerization of the olefin is substantially increased as the temperature increases.

The separation processes are generally carried out by contacting with a contact mass of molecular sieve a mixture of a material capable of being selectively occluded in the molecular sieve and a material not capable of being occluded, until the capacity of the sieve for sorption of the selectively separable material is substantially filled, and then desorbing the occluded material from the sieve, e.g., by evacuation or by passage of an inert gas through the contact mass at elevated temperatures. The conditions in the desorption step may be the same insofar as pressure, temperature, and flow rates are concerned as in the sorption step, or higher temperatures within the range up to 600° C., higher flow rates and different pressures may be employed.

The processes may be carried out using a fixed or moving beds or fluidized particles of the treated zeolitic molecular sieves of this invention.

The following examples illustrate various aspects of the invention but are not to be considered a limitation thereof.

EXAMPLE I

A series of experiments was carried out in which piperylene (1-trans-3-pentadiene) was sorbed in a Linde type A synthetic molecular sieve of about 5 Angstrom pore diameter. The series of runs was carried out with contact masses to which had been added from 0 to 2.2 millimoles of ammonia per gram of dry molecular sieve. The results are tabulated in Table 1.

Table 1

| Experiment No. | Amount of Nitrogen Base | | Residual Polymer, Percent wt. | Sorption Capacity, Percent wt. |
|---|---|---|---|---|
| | Millimoles/gm. | Percent wt. | | |
| 1 | 0.0 | 0.0 | 3.6 | 12.3 |
| 2 | 0.2 | 0.3 | 3.1 | 11.5 |
| 3 | 0.4 | 0.6 | 2.2 | 10.6 |
| 4 | 0.5 | 0.9 | 2.0 | 10.4 |
| 5 | 1.6 | 2.7 | 0.0 | 10.1 |
| 6 | 2.2 | 3.7 | 0.0 | 10.1 |

To carry out these experiments, separate one-gram samples of commercial Linde type 5A molecular sieve in 1/16-inch pellets containing 20% of clay binder were dried in vacuo at 400° C. for one hour. In experiments 2 through 6 anhydrous ammonia was admitted at a constant pressure of a few millimeters of mercury with the sample at temperatures in the range from 60° to 200° C. After equilibration and evacuation for one-half hour, the amount of $NH_3$ remaining on the samples was from 0.2 millimole per gram based on dry molecular sieve in experiment 2 to 2.2 millimoles per gram in experiment 6. No ammonia was presorbed in experiment 1. All samples were brought to 60° C. and piperylene was admitted to all samples at 250 mm. pressure. Equilibrium was reached in experiments 2 to 6 after twenty minutes but the weight of the contact mass in experiment 1 was still increasing even at the end of one hour. Each sample was then heated to 300° C. in vacuo. At the end of one hour, 3.6% by weight of polymer remained on sample 1, 3.1% on sample 2, 2.2% on sample 3 and 2.0% on sample 4 while samples 5 and 6 returned to their original weights before sorption of ammonia and piperylene. The amount of polymer remaining on the desorbed sample is given in column 4 and the useable capacity for piperylene sorption in column 5 of Table 1. It is clearly shown by these data that as much as 0.5 millimole of ammonia per gram of sieve was substantially ineffective in inhibiting polymerization while from 1.6 to 2.2 millimoles of ammonia per gram of sieve was effective. At the same time it is illustrated that the capacity for sorption of piperylene is reduced somewhat as ammonia is added to the contact mass but it reaches a plateau in the range from about 0.4 to 2.2 millimoles of ammonia per gram of sorbent. A substantially greater amount of ammonia, e.g., 5 millimoles per gram of sieve, further substantially reduces the capacity for sorption of normal hydrocarbons in a 5 Angstrom molecular sieve.

EXAMPLE II

The procedure of Example I was repeated with the use of the same type of molecular sieve composite but with ethylene diamine as the nitrogen base. The results are tabulated in Table 2.

Table 2

| Experiment No. | Amount of Nitrogen Base | | Residual Polymer, Percent wt. | Sorption Capacity, Percent wt. |
|---|---|---|---|---|
| | Millimoles/gm. | Percent wt. | | |
| 1 | 0.0 | 0.0 | 3.6 | 12.3 |
| 2 | 0.1 | 0.8 | 3.0 | 11.3 |
| 3 | 0.5 | 2.9 | 0.9 | 10.8 |
| 4 | 0.9 | 5.2 | 0.1 | 9.7 |

The data illustrate that about 0.5 millimole of the base per gram of molecular sieve composite reduced but did not inhibit polymerization while about 0.9 millimole per gram was sufficient to substantially inhibit polymerization. The capacity for piperylene sorption was somewhat lower at this point than with an equal molar amount of ammonia, presumably due to the greater molar volume of ethylene diamine. Adding somewhat more than 2 millimoles of ethylene diamine per gram of sorbent reduced the useful capacity for piperylene to about 2%.

EXAMPLE III

The procedure of Example I was repeated with dimethylamine as the nitrogen base. The results are tabulated in Table 3.

Table 3

| Experiment No. | Amount of Nitrogen Base | | Residual Polymer, Percent wt. | Sorption Capacity, Percent wt. |
|---|---|---|---|---|
| | Millimoles/gm. | Percent wt. | | |
| 1 | 0.0 | 0.0 | 3.6 | 12.3 |
| 2 | 0.3 | 1.5 | a 1.6 | (b) |
| 3 | 1.9 | 8.4 | a 0.0 | (b) | a Approximate.
b Not determined.

It is illustrated that 0.3 millimole of the base was not sufficient to inhibit polymerization whereas 1.9 millimoles per gram inhibited polymerization.

Whereas in Example I the treatment of the molecular sieve containing the sorbed ammonia and piperylene at 300° C. in vacuo for one hour served to remove not only all the piperylene but also all the ammonia, except where polymer remained on the sieve, it was found that the same treatment did not remove all of the bases in Examples II and III. Thus it is demonstrated that bases such as dimethylamine and ethylene diamine are very strongly held on the molecular sieve and would not need to be replaced during operation in a continuously operating unit at ordinary conditions of temperature and pressure, whereas it may be necessary to periodically or continuously replace more volatile bases such as ammonia.

EXAMPLE IV

A procedure similar to Example I was carried out in which the contact mass was a composite of Linde type 13X molecular sieve in the form of 1/16-inch pellets containing about 20% clay binder. The hydrocarbon placed in contact with the sieve was isoprene; the experiments were carried out at a temperature of 60° C. In the first experiment, in which no ammonia was presorbed on the molecular sieve, the amount of isoprene sorbed after two hours was 12.9% by weight of the sieve. On desorption it was found that the sieve contained 2.5% wt. of polymer. In a second experiment, in which 1.8 millimoles of ammonia per gram of dry sieve was first added, the amount of isoprene sorbed after two hours was 10.7% wt. of the sieve and the amount of polymer was found to be only 0.2% wt.

EXAMPLE V

Under conditions similar to experiment 1 of Example I, in which piperylene was contacted with a molecular sieve containing no nitrogen base, an experiment was carried out in which piperylene was contacted with a 4 Angstrom molecular sieve (Linde MS–4A) in the form of dried pellets containing 20% clay binder. It was found that at the completion of the experiment the sieve contained 8.1% wt. of piperylene and that after desorption the sieve contained 0.5% wt. of polymer.

It is thus illustrated that while an untreated 4 Angstrom molecular sieve will sorb piperylene it has a sorption capacity lower than that of a 5 Angstrom molecular sieve treated with ammonia. It is also shown that the polymerization of piperylene occurs on MS–4A though not as rapidly as on MS–5A. Pretreating MS–4A with ammonia inhibits polymerization of piperylene thereon.

EXAMPLE VI

Loss of sorption capacity of molecular sieves due to polymerization of propylene was investigated using a molecular sieve column containing about 50 grams of sieve. The sieve mass was exposed to a mixture of 10% propane and 90% propylene at 185° C. and an initial pressure of 270 p.s.i.a. The effect of polymer buildup on the sieves was followed by periodically evacuating the column and determining the static sorption capacity of the sieve for propylene at atmospheric pressure and room temperature.

With standard 1/16-inch pellets of MS–5A molecular sieves, untreated, over one-fifth of the original capacity was lost in less than three hours and over two-thirds of the original capacity of the sieve was lost after 85 hours of exposure. With molecular sieves containing 3% wt., 2% wt., and 0.25% wt. presorbed ammonia, the loss in capacity after 85 hours exposure was only 3%, 6% and 14%, respectively. With untreated MS 13X sieves, over 75% of their original capacity was lost after only 65 hours of exposure to the propylene.

Results of similar experiments of longer duration are given in Table 4.

Table 4

LOSS IN MS–5A SORPTION CAPACITY[1] UPON EXPOSURE TO PROPYLENE FOR 150 HOURS

| Percent wt. NH₃ | Percent Lost at 145° C. | Percent Lost at 185° C. |
|---|---|---|
| 0 | 25 | 80 |
| 0.25 | 5 | 24 |
| 1.3 | 3 | |
| 2.0 | | 11 |
| 3.0 | <2 | 4 |

[1] Sorption capacity for propylene at room temperature and atmospheric pressure.

EXAMPLE VII

Pentene-1 was contacted with pellets of Linde type 5A molecular sieve at various temperatures for a length of time sufficient to accumulate one percent by weight of polymer on the sieve after equilibration at 400 mm. pentene-1 pressure.

At 350° C., one percent by weight polymer was accumulated in twenty-five minutes; at 250° C. it required five and one-half hours to accumulate the same amount of polymer; to accumulate the same amount of polymer at 200° and 150° C. requires about three and about sixty days, respectively.

EXAMPLE VIII

Experiments were conducted on a ½″ by 7′ molecular sieve (Linde type MS–5A) column operated at 150° C., 250 p.s.i.g., and a volumetric hourly space velocity of 45. The hydrocarbon feed was a C₃ fraction recovered from a commercial catalytic cracking unit and had the following composition: ethane, 1.4%; propane, 41.5%; propylene, 57.0%; isobutane, 0.1%. Percentages are expressed as mol percent.

In one experiment, molecular sieves with 0.3% wt. presorbed ammonia were used in the column. When the C₃ fraction, containing no ammonia, was passed through the molecular sieve column at the above conditions, the molecular sieves lost about 30% of the original sorption capacity for propylene in 140 hours of operation. In a similar experiment, with molecular sieves containing 3.25% presorbed ammonia and the C₃ feed containing 330 parts per million by volume ammonia, the column was operated for over 450 hours with a loss of only about 8.5% of the original capacity. In another experiment with 0.8% presorbed ammonia on the sieves and about 10 parts per million by volume ammonia in the C₃ feed, the column was operated for over 200 hours with only about a 9% loss in original sorption capacity.

In a preferred embodiment of the invention a mixture containing propane, propylene, and a minor amount of ammonia is suitably passed through 5 Angstrom molecular sieves on which 0.3% by weight ammonia, based on the dry sieve, has been presorbed. The propylene is sorbed preferentially by the sieve whereas the propane is substantially unsorbed and appears in the effluent. When the sorption capacity of the sieve for propylene is substantially filled, passage of the mixture through the sieve mass is discontinued and the sieve is regenerated.

The present invention has been illustrated by reference to processes for the separation of normal from non-normal hydrocarbons in which the feed mixture contains reactive olefinic hydrocarbons. The invention is also useful in the treatment of non-sorbed organic feeds containing reactive olefins for the removal of inorganic constituents, e.g., in the removal of water vapor, $CO_2$ or similar components from an olefinic hydrocarbon fraction by contact with a 3 Angstrom molecular sieve. The invention is also useful in contacting mixtures comprising polymerizable olefinic non-hydrocarbons, e.g. acrolein and allylepihydrin ether, with zeolitic molecular sieves.

This application is a continuation-in-part of copending application Serial No. 680,650, filed August 28, 1957.

We claim as our invention:

1. A process for the separation of hydrocarbons which are selectively sorbable on a zeolitic molecular sieve from admixture with non-sorbable hydrocarbons selected from the group consisting of normally liquid olefins and normally vaporous olefins, the mixture containing olefinic hydrocarbons which are polymerizable by contact with a molecular sieve selected from the group consisting of the alkali, alkaline earth and combined alkali-alkaline earth metal aluminum silicates, which comprises sorbing on a zeolitic molecular sieve selected from said group from about 1 to about 2 millimoles per gram of dehydrated zeolite of a nitrogen base having a critical molecular cross section not more than 1 Angstrom unit greater than the pore diameter of said zeolite, said nitrogen base having a molecular weight no greater than about 100, the sorption of nitrogen base being made in the absence of polar solvents for the nitrogen base so that exchange of ammonium ions for metal cations of the sieve does not occur, then contacting said mixture with said base-containing molecular sieve, recovering said non-sorbable hydrocarbons substantially free of sorbable hydrocarbons from the effluent, continuing contact of said mixture until the sorption capacity of said sieve for sorbable hydrocarbons is substantially filled, discontinuing contact of said mixture and regenerating said sieve.

2. A process according to claim 1 in which said nitrogen base is ammonia.

3. A process according to claim 1 in which said nitrogen base is ethylene diamine.

4. A process in accordance with claim 1 in which said nitrogen base is dimethylamine.

5. A process according to claim 1 in which said sorbable hydrocarbon is piperylene and said hydrocarbon mixture comprises piperylene and isoprene.

6. A process for the separation of hydrocarbons which are selectively sorbable on a zeolitic molecular sieve from admixture with non-sorbable hydrocarbons, the mixture containing olefins selected from the group consisting of normally liquid diolefins, normally gaseous diolefins and normally liquid monoolefins which are polymerizable by contact with a molecular sieve selected from the group consisting of the alkali, alkaline earth, and combined alkali-alkaline earth metal aluminum silicates, which process comprises contacting the mixture with a molecular sieve selected from said group and on which is sorbed from about 1 to about 2 millimoles per gram of dehydrated sieve of a nitrogen base having a critical molecular cross-section not more than 1 Angstrom unit greater than the pore diameter of the sieve, said nitrogen base having a molecular weight no greater than about 100, the sorption of nitrogen base having been made without exchange of ammonium ions for metal cations of the sieve, recovering said non-sorbable hydrocarbons substantially free of sorbable hydrocarbons from the effluent, continuing said contacting until the sorption capacity of the nitrogen base-containing sieve for sorbable hydrocarbons is substantially filled, discontinuing said contacting and regenerating said sieve.

7. A process for the separation of hydrocarbons which are selectively sorbable on a zeolitic molecular sieve from admixture with non-sorbable hydrocarbons selected from the group consisting of normally liquid olefins and normally vaporous olefins, the mixture containing olefin hydrocarbons which are polymerizable by contact with a molecular sieve selected from the group consisting of the alkali, alkaline earth and combined alkali-alkaline earth metal aluminum silicates, which process comprises adding to said mixture a minor amount of a nitrogen base to form a feed mixture containing nitrogen base, contacting the feed mixture with a molecular sieve selected from said group and on which sieve is sorbed from about 1 to about 2 millimoles of said nitrogen base per gram of dehydrated sieve, said nitrogen base having a molecular weight no greater than about 100, the sorption having been made without exchanging ammonium ions for the metal cations of the sieve, said nitrogen base having a critical molecular cross-section not more than 1 Angstrom unit greater than the pore diameter of said molecular sieve, recovering said non-sorbable hydrocarbons substantially free of sorbable hydrocarbons from the effluent, continuing said contacting until the sorption capacity of said sieve for said sorbable hydrocarbons is substantially filled, discontinuing said contacting, and regenerating said sieve.

8. A method for inhibiting the polymerization of reactive olefinic compounds in contact with a zeolitic molecular sieve selected from the group consisting of the alkali, alkaline earth, and combined alkali-alkaline earth metal aluminum silicates, during the adsorptive separation of said olefinic compounds from a hydrocarbon mixture containing said olefinic compounds, which comprises sorbing on the zeolitic molecular sieve selected from said group about 1 to about 2 millimoles, per gram of dry sorbent, of a nitrogen base having a critical molecular cross section not more than 1 Angstrom unit greater than the pore diameter of said zeolite, said nitrogen base having a molecular weight no greater than about 100, and the formula

wherein $R_1$, $R_2$ and $R_3$ each represents a radical selected from the group consisting of hydrogen, alkyl groups and non-acidic substituted alkyl groups, and contacting said sieve with at least one reactive olefinic compound selected from the group consisting of normally liquid olefins and normally vaporous olefins, the sorption of nitrogen base being made in the absence of polar solvents for the nitrogen base so that exchange of ammonium ions for metal cations of the sieve does not occur.

9. A method according to claim 8 in which said nitrogen base is ammonia.

10. A method according to claim 8 in which said nitrogen base is ethylene diamine.

11. A method according to claim 8 in which said nitrogen base is dimethylamine.

12. A method according to claim 8 in which the reactive olefinic compound is propylene.

13. A method for inhibiting the polymerization of propylene in contact with a zeolitic molecular sieve selected from the group consisting of the alkali, alkaline earth, and combined alkali-alkaline earth metal aluminum silicates, during the adsorptive separation of propylene from a hydrocarbon mixture containing propylene, which comprises sorbing on the zeolitic molecular sieve from about 0.25% to about 3.0% of ammonia, based on the weight of dry sorbent, the sorption of ammonia being made in the absence of polar solvents for ammonia so that exchange of ammonium ions for metal cations of the sieve does not occur, and contacting said ammonia-containing sieve with a mixture containing propylene.

14. A process for the separation of propylene from propane by contact with a 5 Angstrom molecular sieve containing from about 0.25% to about 3% ammonia, based on the weight of the dehydrated sieve, said molecular sieve being selected from the group consisting of the alkali, alkaline earth, and combined alkali-alkaline earth metal aluminum silicates and the ammonia being sorbed on the sieve without exchange of ammonium ions for metal cations of the sieve, which process comprises contacting said ammonia-containing sieve with a mixture consisting essentially of propane and propylene and a minor amount of ammonia, recovering propane substantially free of propylene from the effluent, continuing said contacting until the sorption capacity of the sieve for propylene is substantially filled, discontinuing said contacting, and regenerating the sieve.

References Cited in the file of this patent

UNITED STATES PATENTS

| | | |
|---|---|---|
| 2,398,468 | Schulze et al. | Apr. 16, 1946 |
| 2,866,835 | Kimberlin et al. | Dec. 30, 1958 |
| 2,899,379 | Wilchinsky et al. | Aug. 11, 1959 |
| 2,925,379 | Fleck et al. | Feb. 16, 1960 |
| 2,930,447 | Barrer | Mar. 29, 1960 |
| 2,957,927 | Broughton et al. | Oct. 25, 1960 |

OTHER REFERENCES

Sachanen: The Chemical Constituents of Petroleum, 1945, Reinhold Pub. Co. (pages 31–32).

Barrer: Jour. Soc. Chem. Ind., vol. 64 (May 1945).